(12) United States Patent
McNally

(10) Patent No.: US 6,311,427 B1
(45) Date of Patent: Nov. 6, 2001

(54) DECORATIVE OUTDOOR PLANT COVER

(76) Inventor: Sally A. McNally, 728 Easley St., Westland, MI (US) 48186

( * ) Notice: Subject to any disclaimer, the term of this patent is extended or adjusted under 35 U.S.C. 154(b) by 459 days.

(21) Appl. No.: 08/799,499

(22) Filed: Feb. 12, 1997

(51) Int. Cl.$^7$ ................................................. A01G 13/04
(52) U.S. Cl. ................................................. 47/29; 47/26
(58) Field of Search ................................. 47/29, 30, 21, 47/26; D8/1; D11/143, 164

(56) References Cited

U.S. PATENT DOCUMENTS

| | | | |
|---|---|---|---|
| 2,009,867 | * 7/1935 | Ball | 47/26 |
| 2,141,484 | * 12/1938 | Piglia | 47/30 |
| 3,384,992 | * 5/1968 | Heffron | 47/29 |
| 4,829,707 | * 5/1989 | Koffler et al. | 47/29 |

FOREIGN PATENT DOCUMENTS

| | | | |
|---|---|---|---|
| 2050552 | * 3/1993 | (CA) | 47/40.5 |
| 1452430 | * 10/1976 | (GB) | 47/21 A |
| 1688803 | * 11/1991 | (SU) | 47/21 |
| 1724088 | * 4/1992 | (SU) | 47/21 A |

* cited by examiner

Primary Examiner—Michael J. Carone
Assistant Examiner—Joanne C. Downs
(74) Attorney, Agent, or Firm—John R. Benefiel

(57) ABSTRACT

A hollow decorative cover for outdoor plants and shrubs having a weather resistant sheath of lower and upper portions and an inner supporting frame attached to an upper sheath portion anchoring said sheath portion to the ground, the upper sheath portion optionally including a lid portion adapted to contain weighty material and being optionally removable for ventilation and sunning purposes.

6 Claims, 3 Drawing Sheets

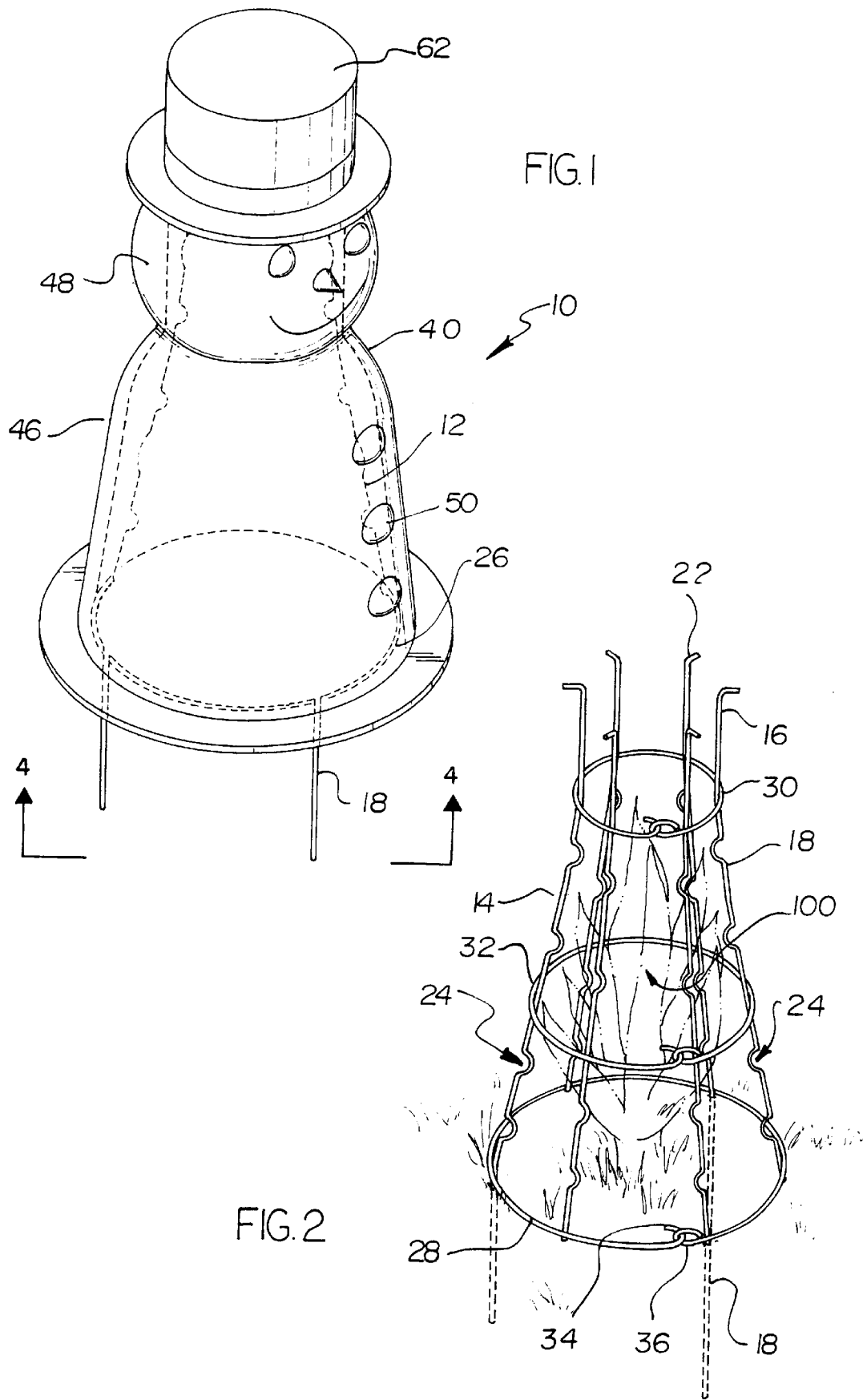

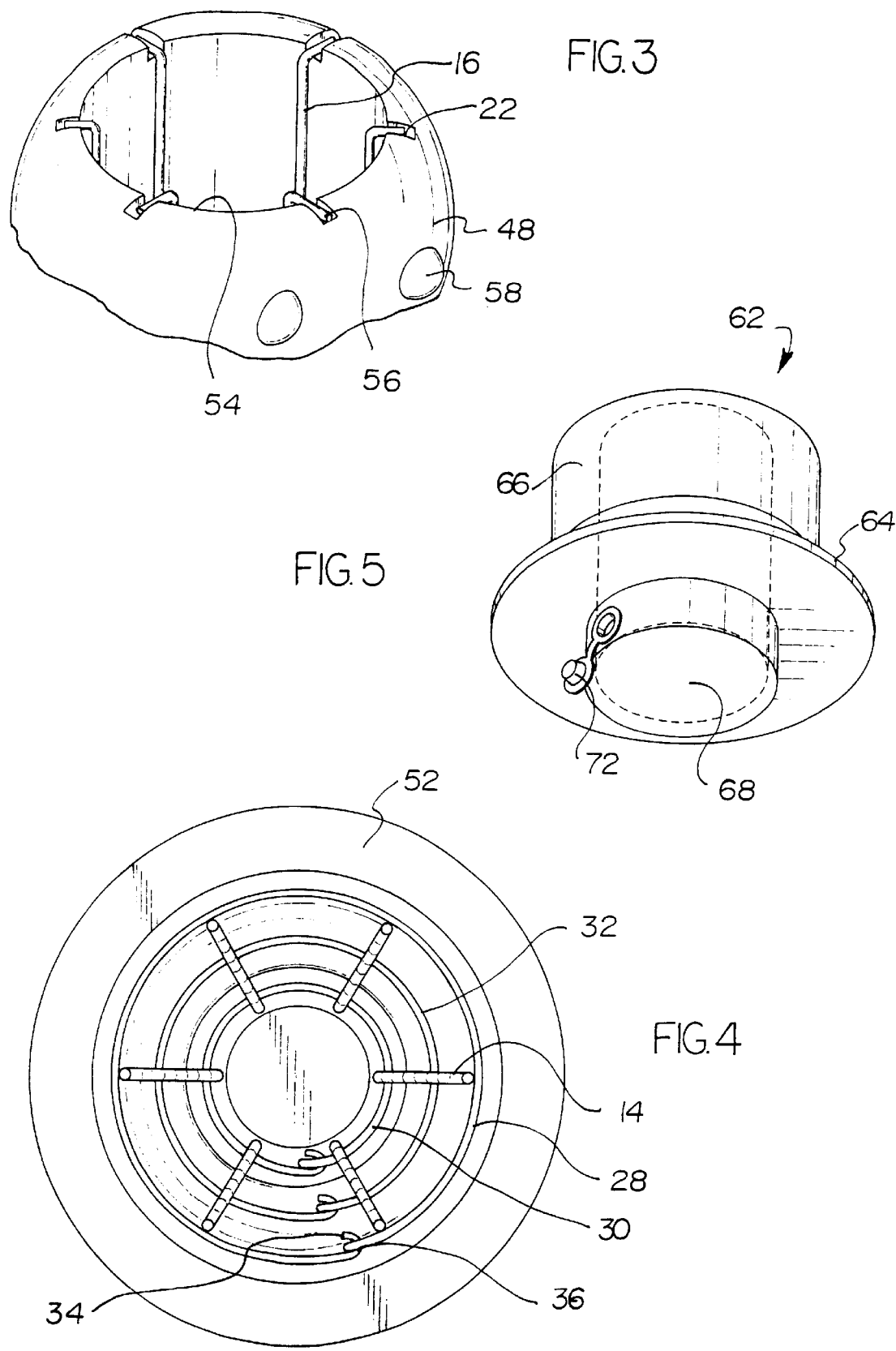

DECORATIVE OUTDOOR PLANT COVER

BACKGROUND OF THE INVENTION

The present invention relates to an anchored outdoor plant cover for protecting shrubs and plants that is both decorative and supported and anchored to the earth so as to maintain stability of the cover during high winds and otherwise protect the enclosed plant or shrub against harsh weather conditions.

The prior art includes plant covers for both indoor and outdoor plants having a variety of structural configurations developed for the fulfillment of numerous requirements and objectives.

Known examples of plant covers include U.S. Pat. No. 4,903,431 to Stoll which discloses a translucent plant cover in the form of a hexagonal column formed by folding corrugated plastic side panels and including a hinged lid panel operable for plant ventilation purposes.

U.S. Pat. No. 4,265,049 to Gorewitz discloses a flexible plastic sheet cover for indoor houseplants providing means for tying the sheet edges together so as to encompass the plant and form an enclosed trough to catch excess water added to the plant.

U.S. Pat. No. 4,267,665 to Wallace, et al, discloses a double wall tubular device for thermally protecting outdoor plants comprised of inner and outer wall sections having a plurality of side by side tubes that are closed at the bottom and open at the top for filling with water and air.

U.S. Pat. No. 4,018,003 to Mirecki describes a hot cap for plants of plastic or cardboard of triangular shape, each sheet provided with a central notch forming four flaps that are folded together in similar fashion to a conventional cardboard container, and the lower edges of the sheets are of generally circular shape and are depressed into the earth.

U.S. Pat. No. 4,164,341 discloses a two section hollow mold for forming large figures from snow, the halves of the mold when connected enclose the shape of a three snowball traditional snowman and after packing the snow in each section the mold sections are disconnected and removed thus forming a three ball snowman.

None of the known prior art discloses a shrub or plant cover suitable for protecting shrubs and plants during the winter season that combines an outer sheath and an integrally attached internal support and anchoring means suitable to resist high winds as well as snow and icing conditions during northern winters that also has a pleasing decorative appearance that enhances the lawns or gardens in which it is placed for extended time periods.

SUMMARY OF THE INVENTION

The subject invention provides a shrub or plant cover that is functional to protect plants from month long periods of ice, snow, rains, and winds and is also sufficiently decoratively attractive to enhance the appearance of the lawn or garden in which it is installed. These advantages relative to the prior known plant covers are achieved by combining the pleasing appearance of an outer weather resistant sheath with an internally attached supporting and anchoring frame that connects the sheath to the earth, integrally, by a plurality of vertically extending leg members that are securely attached to the internal locations near the top of the sheath.

The combination structure of this invention provides a number of advantages relative to any heretofore known plant covers.

One important functional advantage of a shrub cover of substantial height which is subjected to high wind forces, sufficient to topple an unanchored cover is that the buried end of the legs, selectively having lower end portions, are connected internally directly to plural locations near the top of the sheath to maintain the cover in its protective position around the shrub or plant during high winds.

Another advantage of the preferred tall form of the sheath is that the sheath includes an upper lid portion, positioned atop the intermediate portion of the sheath that is removable during calm, sunny days to provide ventilation. and sun to the enclosed shrub or plant. Means of ventilation variable depending upon artistic composition, it is understood that the sheath portion may utilize other means to achieve said objective, possibly incorporating ventilation within a single component sheath. In a preferred form of the invention the upper lid portion optionally includes an interior chamber adapted to be filled with a weighty material, for example sand, gravel, or the like, that provides additional anchoring and stability during high wind conditions. The optional interior chamber of said optional lid also serves as a mechanism of location maintenance when uncoupled from said intermediate portion of said sheath.

The decorative appearance of the outdoor shrub and plant cover of this invention as shown in FIGS. 1 through 7 of the drawings is another advantage of this invention since the covers are additions to lawns and gardens that will remain in place for winter long periods and be visible to the public. It is understood that artistic persons may paint modify and create other appearances to the exterior sheath of this invention and that FIGS. 1 through 7 are illustrative only. It is further understood that any adornments may be added by said artistic persons, said adornments including but not limited to lighting and or mechanical motion.

Another advantage of this invention is that the exterior sheath and the internal frame may be fabricated from inexpensive weather resistant materials such as extrudable or formable plastics of the polyethylene, polypropylene, or polyurethane types and that the frame components are inexpensive iron or steel rods, bars, or channels, and that these components are separable for packaging and shipping and easily assembled such that the covers of this invention will be available for mass consumption at inexpensive prices.

It is therefore an object of the present invention to provide new, improved, decorative plant and shrub covers which have significant advantages over all the known prior art.

It is a further object of this invention to provide new and improved decorative plant covers which may be easily and efficiently manufactured and marketed.

Lastly, it is an object of this invention to provide an improved outdoor plant and shrub cover which is the combination of a decorative weather resistant external sheath and an internal supporting and anchoring frame which attaches a portion of the sheath near its top directly with the ground so as to maintain the stability of the cover under high wind, harsh conditions.

These together with the other objects of the invention, along with the various features of novelty which characterize this invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 1 is a perspective view of a preferred embodiment of the decorative outdoor plant cover of this invention decorated to represent a snowman.

FIG. 2 is a perspective view of the interior supporting and anchoring frame of this invention.

FIG. 3 is a partial top view of the intermediate head portion of the snowman of FIG. 1 showing its attachment to the frame of FIG. 2.

FIG. 4 is a bottom view of the snowman and taken along line 4—4 of FIG. 1.

FIG. 5 is a bottom elevation view of the upper lid portion of the snow man of FIG. 1.

DESCRIPTION OF THE PREFERRED EMBODIMENTS

Figure 6:
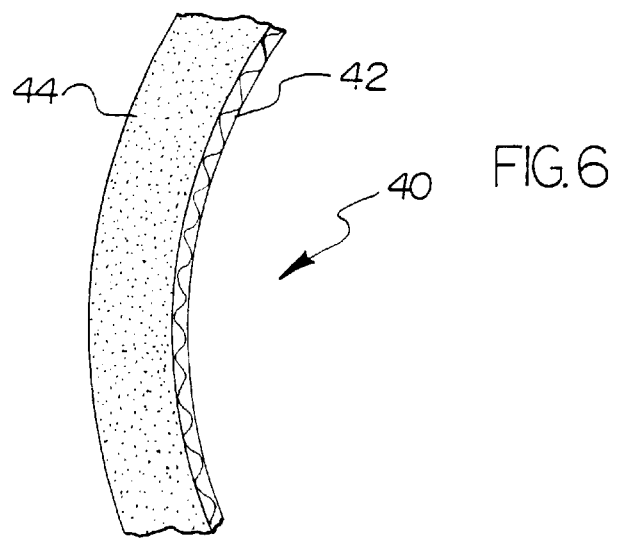
FIG. 6 is a cross-sectional view of a preferred form of the outer sheath of the snowman of FIG. 1.

A preferred embodiment of the outdoor plant cover of this invention is shown in FIGS. 1–7 and will be described with reference to the decoration of the outer sheath as a snowman, designated generally as 10 in FIG. 1. This invention results from the combination of the frame of FIG. 2 and the outer sheath generally designated 40 which includes the lower portion 46, the intermediate portion 48, which simulates the snowman's head, and the upper lid portion 62 which simulates the snowman's hat.

The frame of FIG. 2, as shown, includes six vertically extending leg members, generally designated 12, each leg having a lower anchoring portion 18, an intermediate portion 14, and as upper portion 16 which terminates as its upper end in an outwardly extending attachment portion 22, as shown in FIGS. 2 and 3, the intermediate portion 14 of the leg 12 having a series of indentations 24 adapted for receiving rope of twine (not shown) which serves to further protect the plant. The frame also includes three spaced apart ring members, an upper ring 30, an intermediate ring 32, and a lower ring 28. These rings 28, 30, and 32 surround the six leg members designated generally as 12 and can be adjusted to unify and stabilize the frame when the lower extremity 18 of each leg 12 is placed in the ground to the positions that limit the converging legs so as to conform to the generally conical angle of the outer sheath 40 of the snowman of FIG. 1 and fit into the diameter of the opening 54 in the head portion 48 as shown in FIG. 3. When that angular relationship of the legs 12 is thus established it is desirable to adjust the diameters of rings 28, 30, and 32 such that they are positioned around and supporting the plant generally designated 100 in FIG. 2. This adjustment can easily be done by adjusting the connections 34 and 36 of each of these rings 28, 30, and 32.

As may be seen by referring to FIGS. 3, 4, and 5, the assembly of the decorative snowman cover 40 is completed by positioning the upper lid portion 62 in place. This is done by lowering the downwardly extending cylindrical portion 68 of the lid into the opening 54 of the intermediate head position 48 and into pressure engagement with the vertical portion of each of the upper end leg portions and simultaneously placing the lower surface of outwardly extending flange 64 into pressure contact with the top surface of each of the outwardly extending upper extremities 22 of the legs 16 positioned in the slots when the lid portion 62 is in the position which closes opening 54, and the lower extremities of the legs 18 are sunk into the earth.

FIG. 6 illustrates a segment of the sheath 40 having an insulated interior layer 42 for use in cold and harsh conditions.

Figure 7:
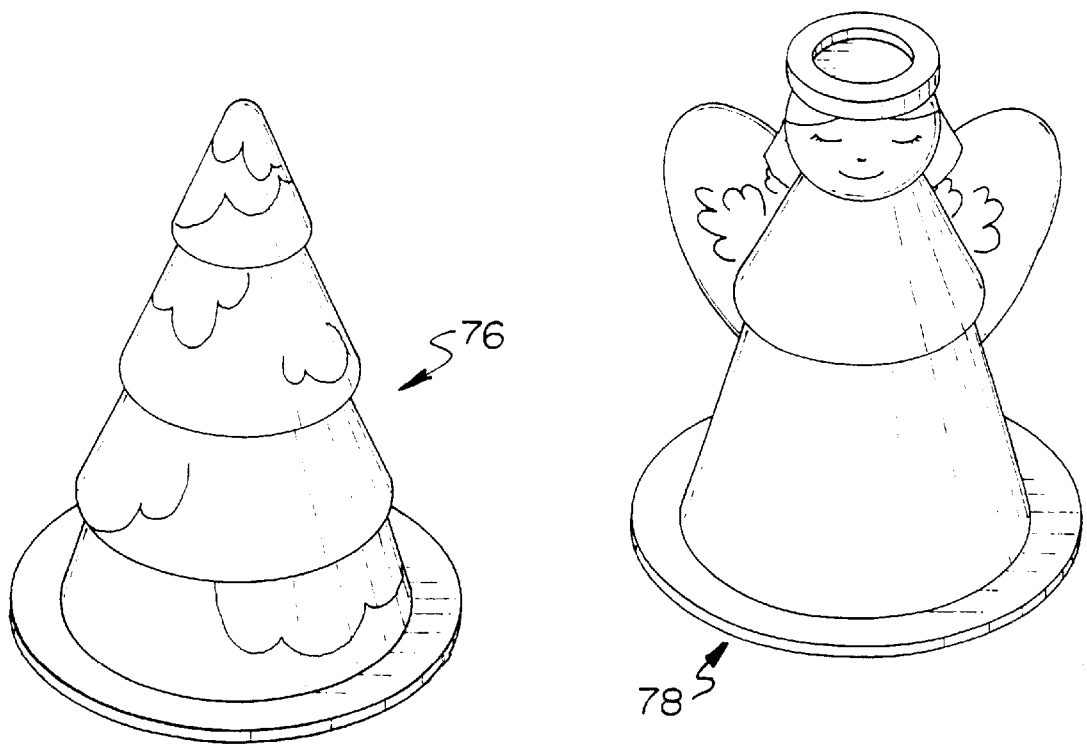
FIG. 7 is a perspective view of alternative shapes and decorations of the outer sheath of outdoor plant covers of this invention.

FIG. 7 shows the sheath in alternate designs. Such designs are decorative in nature and can include, but are not limited to, a Christmas tree 76 and an angel 78.

For greater rigidity and resistance to high winds, snow, and ice, it is desirable to position the maximum amount of weighty material, such as sand, in the cavity 68 of the upper lid portion 62 as above explained in the brief summary.

It is desirable to press the lower end leg portions 18 into the ground so that the lower flange 52 is in contact with the ground. Increased anchoring of the frame 12 may he achieved by trenching to receive flange 52 and covering its upper surface with earth, bricks or other heavy objects. As shown in FIG. 2, even greater anchoring of frame 12 than merely pressing each leg into the earth can be obtained by enlarging the extreme lower end portions 18 of the legs such as incorporating ball like ends on each buried leg portion 18.

What is claimed is:

1. A plant cover comprising:
    a frame having elongated lower portions adapted to be penetrated into the ground and anchor said frame;
    a sheath covering open at the bottom adapted to overlie said frame and extending to the ground, said sheath covering defining an enclosed space adapted to receive a plant therein to protect the same from cold weather conditions;
    said sheath covering being formed in a shape simulating an ornamental figure.

2. The plant cover according to claim 1 wherein said sheath covering simulates a snowman.

3. The plant cover according to claim 1 wherein said sheath covering simulates an evergreen tree.

4. The plant cover according to claim 1 wherein said sheath simulates an angel.

5. The plant cover according to claim 1 wherein said frame is constructed of formed wire, and having straight wire sections comprising said elongated lower portions anchoring said frame.

6. The plant cover according to claim 5 wherein said sheath covering is attached to said frame.

* * * * *